Oct. 11, 1932.    G. Y. MALCOLM    1,881,780
LOOSE PULLEY
Filed March 25, 1930

Inventor
G. Y. Malcolm
by J. Edw. Maybee
ATTY.

Patented Oct. 11, 1932

1,881,780

UNITED STATES PATENT OFFICE

GEORGE Y. MALCOLM, OF TORONTO, ONTARIO, CANADA

LOOSE PULLEY

Application filed March 25, 1930. Serial No. 438,839.

This invention relates to pulleys, and particularly to that class adapted for use as idlers. My object is to devise a pulley having an internal reservoir for oil for lubrication of the shaft. While such pulleys are not broadly new, they have heretofore been of a more or less complicated nature involving making the pulley of two or more parts bolted together.

My object is to devise a simple pulley of integral construction which is simple to construct and to position on the shaft, and with which the shaft will be efficiently oiled.

Figure 1:
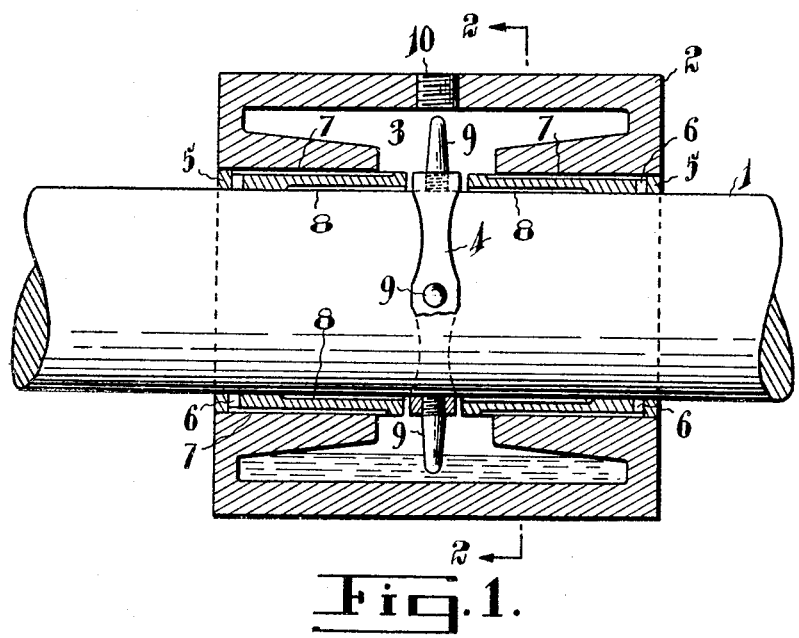
Figure 2:
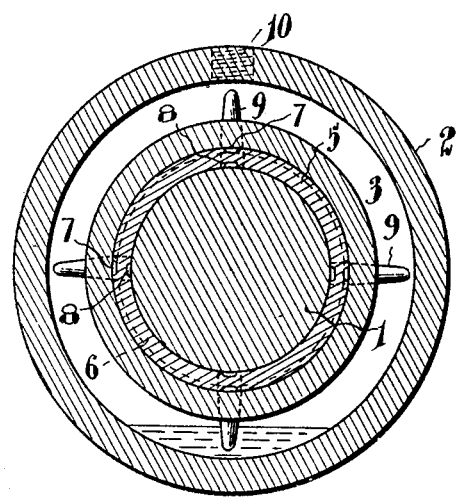

I attain my object by means of the construction hereinafter described and illustrated in the accompanying drawing in which Fig. 1 is a cross section of the pulley, taken longitudinally of the shaft, illustrating my improved construction; and Fig. 2 a cross section taken transversely of the shaft.

In the drawing like numerals of reference indicate corresponding parts in the different figures.

1 indicates the shaft on which the pulley 2 is mounted. The pulley is of integral construction and has in its inner surface an undercut annular oil chamber 3 of considerable width. The mouth of the oil chamber, is itself of considerable width, and fitted on the shaft and extending into this chamber is an oil distributor 4. Fitted between the shaft and the pulley are two sleeves 5, one at each side of the distributor. The adjacent ends of the sleeves 5 are, however, spaced apart sufficiently to allow considerable play of the distributor 4.

The sleeves 5 are each provided with an annular collecting groove 6 in their inner surface adjacent their outer end and on the outer surface of each sleeve is formed one or more grooves 7 extending longitudinally of the shaft and leading back to the oil chamber 3. The inner surface of each sleeve is also provided with one or more grooves 8, also extending longitudinally of the shaft from the inner end of the sleeve towards the annular groove 6.

The distributor 4 is formed as a ring fitting the shaft 1 and having one or more threaded holes therein in which is or are fitted pins 9. Through the face of the pulley opposite the distributor 4 is a hole 10, which is normally closed by a suitable plug. This hole not only may be used for filling purposes, but by means of a suitable tool, the pins 9 may be removed from or positioned in the ring of the distributor.

The operation of the device is as follows. The oil chamber 3 is filled at least partially with oil. As the pulley revolves on the shaft which is then stationary, oil is collected from the back of the recess by the pins 9 and is led to the shaft along which it travels outwardly in the grooves 8 in the sleeves to lubricate the shaft 1. The oil is collected in the annular grooves 6 and passes to the outer grooves 7 and led back to the oil reservoir 3.

The ring 4, it will be noticed, is of reduced width intermediate the pins. The reason for this is that if the ring moves over against either of the sleeves 5, oil will be permitted to flow between the ring and the adjacent edge of the flange.

A set screw or other means may be employed to prevent relative movement between the shaft and distributor.

What I claim as my invention is:

1. The combination with a shaft of an integral pulley rotatable relative to the shaft, said pulley having an annular oil reservoir in its inner surface; sleeves fitted on said shaft within the pulley one at each side of the oil reservoir, the inner ends of said sleeves being spaced from one another, each of said sleeves having an annular collecting groove on its inner surface adjacent its outer end; a longitudinal groove in its inner face leading from the space between the sleeves; a longitudinal groove in its outer face leading from the collecting groove back to the oil reservoir; and an oil distributor mounted on said shaft between the sleeves, the sides of said distributor being serrated to permit oil to enter between the edge of the ring and the adjacent edge of the sleeve.

2. The combination with a shaft of an integral pulley rotatable relative to the shaft, said pulley having an annular oil reservoir in its inner surface; sleeves interposed between said shaft and pulley at each side of the oil reservoir, the inner ends of the sleeves being spaced from one another, each of said sleeves having an annular collecting groove on its inner surface adjacent its outer end; a and a longitudinal groove in its outer face leading from the collecting groove back to the oil reservoir; and an oil distributor mounted on said shaft between the sleeves, said distributor comprising a ring of lesser diameter than the bore of the pulley and of lesser width than the space between the sleeves, said ring having a plurality of removable radially directed pins projecting therefrom, the pulley having a hole formed through its face opposite said ring through which the pin is accessible.

3. The combination with a shaft of an integral pulley rotatable relative to the shaft, said pulley having an annular oil reservoir in its inner surface; sleeves interposed between said shaft and pulley at each side of the oil reservoir, the inner ends of the sleeves being spaced from one another, each of said sleeves having an annular collecting groove on its inner surface adjacent its outer end, a longitudinal groove in its inner face leading from the space between the sleeves part way towards the annular groove, and a longitudinal groove in its outer face leading from the collecting groove back to the oil reservoir; and an oil distributor mounted on said shaft between the sleeves, said distributor comprising a ring of lesser diameter than the bore of the pulley and of lesser width than the space between the sleeves, said ring having a plurality of removable radially directed pins projecting therefrom, the pulley having a hole formed through its face opposite said ring through which the pin is accessible.

Signed at the city of Toronto, Canada, this 20th day of March, 1930.

GEORGE Y. MALCOLM.